(12) United States Patent
Page et al.

(10) Patent No.: US 7,008,992 B1
(45) Date of Patent: *Mar. 7, 2006

(54) WATER INSOLUBLE NON-IONIC GRAFT COPOLYMERS

(75) Inventors: Loretta Ann Grezzo Page, Newark, DE (US); Kathryn Amy Pearlstine, Wilmington, DE (US); Waifong L. Anton, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/120,608

(22) Filed: Jul. 22, 1998

(51) Int. Cl.
*C08L 51/00* (2006.01)
*C09D 11/10* (2006.01)

(52) U.S. Cl. ...................... 524/504; 523/160

(58) Field of Classification Search ............... 523/160, 523/161; 106/31.13, 31.27, 31.28, 31.6
See application file for complete search history.

(56) References Cited

U.S. PATENT DOCUMENTS

| | | | |
|---|---|---|---|
| 5,085,698 A * | 2/1992 | Ma et al. | 524/388 |
| 5,231,131 A * | 7/1993 | Chu et al. | 524/504 |
| 5,480,953 A | 1/1996 | Sugaya et al. | 526/320 |
| 5,712,359 A | 1/1998 | Auschra et al. | 526/329 |
| 5,814,685 A * | 9/1998 | Satake et al. | 523/201 |
| 5,821,283 A * | 10/1998 | Hesler et al. | 523/161 |
| 5,853,861 A * | 12/1998 | Held | 428/207 |
| 5,883,157 A * | 3/1999 | Yamashita et al. | 523/161 |
| 5,888,253 A * | 3/1999 | Yamamoto et al. | 8/466 |

FOREIGN PATENT DOCUMENTS

| | | | |
|---|---|---|---|
| EP | 0826751 | * | 3/1998 |
| EP | 0851014 | * | 7/1998 |
| WO | WO 97/14448 | | 4/1997 |

OTHER PUBLICATIONS

Okuno et al.; Preparation of Copolymer Membranes from Hydrophilic and Hydrophobic Monomers and Permselectivites of their Membranes for Aqueous Ethanol Solutions by Prevaporation and Evapomeation, *Chemical Abstracts*, 116, No. 22, 650-656, 1992.

Carrot et al., Synthesis and Characterization of Amphilphilic Networks Obtained by Copolymerization of Poly(ethylene oxide) Macromonomers with Methyl Methacrylate, *Polymer Bulletin*, 40 No. 2/03, 181-188, (1998).

* cited by examiner

*Primary Examiner*—Callie Shosho
(74) *Attorney, Agent, or Firm*—Bart E. Lerman

(57) ABSTRACT

A non-ionic graft copolymer has a hydrophobic backbone and non-ionic, hydrophilic side chains having a molecular weight of at least 500, preferably 100–2000 is substantially insoluble in water, but soluble in an aqueous vehicle, and is particularly suited for use in aqueous coating compositions in which water comprises no more than 80% by weight of the vehicle for the composition.

11 Claims, No Drawings

WATER INSOLUBLE NON-IONIC GRAFT COPOLYMERS

BACKGROUND OF THE INVENTION

This invention relates to polymers and, more particularly, to non-ionic graft copolymers that are soluble in aqueous vehicles but are substantially insoluble in water. The graft copolymers are particularly useful as film-forming binders in aqueous dispersions, such as paints or inks, and overcoat compositions.

For many reasons, aqueous dispersions are widely used as coating compositions, such as paints and inks. While these aqueous dispersions have the obvious environmental benefits over their solvent-based counterparts, the aqueous nature of the dispersion creates some unique disadvantages. For instance, the components in an aqueous dispersion need to be soluble or dispersible in the vehicle, which is mostly water. Thus, the coating tends to be sensitive to water or high moisture, which makes it unsuitable for many of its intended applications. To overcome this problem, a class of polymers known as binders has been developed. These binders, when added to the coating composition, are intended to function as film forming agents that effectively bind the various components of the coating together, particularly the pigment particles used in such coatings, as the coating dries or cures. The use of a proper binder can dramatically improve certain properties of the coating, such as resistance to smear, abrasion, water and washing (i.e., detergents).

An additional challenge is presented in selecting binders for ink applications, particularly ink jet inks. Ink jet ink printing is a form of digital printing in which droplets of ink are made to be ejected (i.e., "fire") from an orifice in a printhead or a spray nozzle in response to an electronic signal from, for example, a computer. Examples of ink jet printing include the thermal ink jet printing, piezoelectric ink jet printing, continuous ink jet printing and air brush printing.

While paints and other coating applications can be in a variety of ways, ink jet inks must be applied by ejecting or jetting small droplets of ink from an orifice in a printhead. In addition, the ink must be formulated such that it will not form a film on the components of the printhead (e.g., resistors used in thermal ink jet printheads), won't puddle on the orifice plate, and won't dry out and clog the openings in the orifice plate. Further, ink jet inks have a much narrower viscosity tolerance than do paints or similar coating applications. Thus, it is far more difficult to formulate ink jet inks as compared to other coatings and, in particular, the requirements of the binder polymer are significantly more demanding. For example, whereas a paint might be formulated to contain 30–40% by weight of a binder polymer, an ink cannot tolerate more than about 20% as a theoretical maximum given the current printhead technology and, in most prior art, the binder content cannot exceed about 2–4% by weight of the ink composition.

In the past decade, ink jet printing, particularly the thermal and piezo forms, has become extremely popular for home office, small office and personal printer applications, primarily due to its relatively low cost, speed and quite operation. In more recent years, the popularity of ink jet printing has increased even further due to the introducing of systems (printers, software, media and inks) offering very high quality (near photographic) color and graphics capabilities. As the capabilities of ink jet technology increase, the use of such technology has expanded into other market segments, such as in large format and very large format applications. In general, the terms "large format" and "very large format" are used to define a class of printers that operate with a particular size media. For example, large format is commonly used to mean printers utilize media of not less than 17 inches in the smallest dimension and very large format is normally used to means printers that utilize media of not less than about 60 inches in the smallest dimension. Such printers are used for applications such as banners, signage, displays, posters, billboards, as well as textile printing applications for clothing, fabrics, draperies and similar applications.

The use of ink jet printing in the large and very larger format applications (for convenience, collectively referred to as "large format") has important advantages, not the least of which is the savings in short production runs over more traditional analogue printing methods. Yet, there are also disadvantages. For example, the types of final products produced for these applications may be subject to the elements in outdoor usage (e.g., billboad or awning applications), laundering (e.g., clothing applications), abrasive friction (e.g., automobile interior fabrics), etc. and thus need to be far more lightfast, waterfast, washfast and abrasion resistant than typically required for office or home printing applications. While much improvement has been made in enhancing lightfastness and waterfastness of ink jet inks in recent past, due to the use of pigment colorants, there is a need in the art for improving the resistance of ink jet inks to smear, abrasion and washing.

SUMMARY OF THE INVENTION

In one aspect, the invention comprises a non-ionic graft copolymer binder having a hydrophobic backbone and non-ionic, hydrophilic side chains, which binder is soluble in an aqueous vehicle but substantially insoluble in water.

In another aspect, the invention comprises an aqueous coating composition comprising
 a) an aqueous vehicle comprising no more than 80% by weight water, the remainder of the vehicle comprising water soluble or water miscible organic co-solvents;
 b) a non-ionic graft copolymer binder having a hydrophobic backbone and non-ionic, hydrophilic side chains, which binder is soluble in the aqueous vehicle but substantially insoluble in water.

In yet another aspect, the invention comprises a washfast, detergent-resistant aqueous ink particularly suited for textile printing, comprising:
 a) an aqueous vehicle comprising no more than 80% by weight water, the remainder of the vehicle comprising water soluble or water miscible organic co-solvents;
 b) an insoluble colorant, preferably a pigment and polymeric dispersant; and
 c) a non-ionic graft copolymer binder having a hydrophobic backbone and non-ionic, hydrophilic side chains, which binder is soluble in the aqueous vehicle but substantially insoluble in water.

DETAILED DESCRIPTION OF THE EMBODIMENTS

The invention provides a non-ionic graft copolymer binder and an aqueous coating composition containing same, that is particularly suitable for use in aqueous pigmented ink jet inks. Inks incorporating these graft copolymers are disclosed in co-pending U.S. application No.

09/120,922, filed contemporaneously herewith (Docket No. IJ-0007), the disclosure of which is incorporated herein by reference.

Aqueous Vehicle

The aqueous vehicle is a mixture of water and at least one co-solvent and comprises no more than 80% by weight, of water. The co-solvent used is determined primarily by the end use application. However, the co-solvent is typically water soluble or water miscible so as to form a single phase vehicle with water.

The precise composition of the aqueous vehicle will vary depending upon the type of composition being made, its ultimate use, the method of applying the composition, the type of substrate being coated and the other ingredients in the composition. Generally speaking for ink applications, the vehicle comprises preferably 60–70% water, with the balance being a mixture of one or more gylcols, a glycol ethers and pyrrolidones. Representative water-miscible or water soluble co-solvents for ink applications are disclosed in U.S. Pat. No. 5,221,334, incorporated herein by reference.

Non-ionic Graft Copolymer

The graft copolymers of this invention comprises a hydrophobic backbone with non-ionic, hydrophilic side chains. The copolymers are soluble in the vehicle, but substantially insoluble in water.

The non-ionic hydrophilic side chains of the graft copolymer comprise macromonomers which are soluble in water but are insoluble in non-polar organic solvents. The water-solubility of these macromonomers enable the graft copolymer to miscible in an aqueous vehicle. The non-ionic nature of the side chain allows the binder to be washfast even to soaps and detergents, which are generally anionic or cationic and will solubilize species of the opposite ionic charge. The non-ionic nature of the side chains also reduces the risk of corrosion of metal pens or other application devices. The macromonomers are made from non-ionic monomers such as ethyoxytriethylene glycol methacrylate, methoxypolyethylene oxide methacryate, methoxypolyethylene oxide acryate, polyethylenoxide methacrylate, polyethylene oxide acrylate, N-vinyl pyrrolidone and the like.

The hydrophobic backbone serves as the water-insoluble, abrasion resistant portion of the binder. By selecting monomers of appropriate glass transition temperatures and crystallinites, binder properties such as hardness, flexibility, and durability can be adjusted. The hydrophobic backbone of the graft copolymer is prepared from monomers such as methyl acrylate, methyl methacrylate, styrene, alpha-methyl styrene, phenyl acrylate, phenyl methacrylate, benzyl acrylate, benzyl methacrylate, 2-phenylethyl acrylate, 2-phenylethyl methacrylate, 2-phenoxyethyl acrylate, 2-phenoxyethyl methacrylate, 1-naphthalyl acrylate, 2-naphthalyl acrylate, 2-naphthalyl methacrylate, p-nitrophenyl acrylate, p-nitrophenyl methacrylate, phthalimidomethyl acrylate, phthalimidomethyl methacrylate, N-phenyl acrylamide, N-phenyl methacrylamide, N-benzyl acrylamide, N-(2-phenylethyl) acrylamide, N-(2-phthalimidoethoxymethyl) acrylamide, vinyl benzoate, ethyl acrylate, n-butyl acrylate, 2-ethylhexyl acrylate, ethyl methacrylate, n-butyl methacrylate, t-butyl methacrylate, 2-ethylhexyl methacrylate, cyclohexyl methacrylate, vinyl acetate, vinyl butyrate, and the like.

The hydrophobic backbone may contain up to 30% by weight, based on the total weight of the graft copolymer, or a hydrophilic non-ionic monomer, as listed above. Similarly, the hydrophilic side chains may contain up to 30% by weight, based on total weight of the graft copolymer, of a hydrophobic monomer, as listed above. The side chains have a number average molecular weight of at least 500, preferably 1,000–2,000. The side chains comprises 15–60% by weight of the graft copolymer, preferably 20–50%. By adjusting the hydrophilic/hydrophobic balance of the backbone and side chains, the binder can be tailored for solubility in aqueous vehicles, while in itself being water insoluble.

Although random copolymers can be used as binders, they are not as effective in solubility and durability properties as graft copolymers. Since random copolymers exhibit the average properties of the individual monomers balancing properties to yield binders which are soluble in aqueous vehicle while being substantially insoluble in water, which are durable, abrasion resistant and flexible, and which can be reliably applied from demanding devices such as an ink jet head is very difficult, if not impossible, to achieve.

The graft copolymers are prepared using standard grafting techniques known to those skilled in the polymer art. Particular synthesis techniques and conditions are set forth in the examples.

Other Ingredients

The coating compositions encompassed by this invention can contain other ingredients as desired for the particular application. For example, if the composition is intended for use as an ink, a pigment and dispersant, or a dye colorant can be added, as is known in the art. In addition, standard ink adjuvants such as surfactants, biocides, sequestering agents, humectants, coalescents, viscosity modifiers, defoaming agents, UV absorbers, corrosion inhibitors, and the like may be used to advantage. Many of these types of additives are also used in other coatings compositions (e.g., paints), although the precise compound used in each application is likely to be different.

For example, when the coating composition is intended for use as an overcoat composition to protect images on vinyl and other hydrophobic substrates, it has been found advantageous to incorporate a silicone or fluorinated surfactant. Such surfactants are disclosed in co-pending U.S. patent application No. 08/867,373, filed Jun. 2, 1997, the disclosure of which is incorporated herein by reference. Particularly preferred are the BYK brand of silicone surfactants from BYK-Chemie, the Silwet® brand of silicone surfactants from OSI Specialties and the Zonyl® brand of fluorinated surfactants from DuPont.

EXAMPLES

Example 1

A 5-liter flask was equipped with a mechanical stirrer, thermocouple, N2 inlet, and addition funnels. N-methyl pyrrolidone, 864 gm; isopropanol, 216 gm; and a 50% solution of methoyoxypolyethyleneglycol methacrylate (Bisomer S20W, International Specialty Chemicals) in water, 108 gm, was added to the pot, and were heated to reflux. Feed I [Bisomer S20W, 612 gm], Feed II [methylmethacrylate, 720 gm and styrene, 120 gm], and Feed III [VAZO. 67. 24 gm dissolved in N-methyl pyrrolidone, 216 gm] were started at time 0.0 minutes. Feeds I and II were added over 360 min; Feed III was added over 390 min. After all feeds were complete, the reaction was refluxed and additional 30 minutes. At 420 min. 240 gm of solvent were distilled off, and 272 gm of N-methyl pyrrolidone were added. The final product was a solution of a graft copolymer of methylmethacrylate(60)-co-styrene (10)-g-methoxypolyethyleneglycol methacrylate (30) at 40.6% solids.

Example 2

A 2-liter flask was equipped with a mechanical stirrer, thermocouple, N2 inlet, and addition funnels. A Monomer Solution [isopropanol, 345 gm, a 50% solution of methoxy-polyethyleneglycol methacrylate in water (Bisomer S20W. International Specially Chemicals), 230 gm, methyl methacrylate, 310 gm, and styrene, 25 gm, were placed in an addition funnel. An Initiator Solution [VAZO(52, 10 gm dissolved in N-methyl pyrrolidone, 40 mg] was placed in a second addition funnel. Isopropanol, 190 gm, and 10% of the Monomer Solution were added to the pot and heated to reflux. After reflux was achieved, 10% of the Initiator Solution was dropped into the pot. The remainder of the Monomer Solution and 80% of the Initiator Solution were fed into the pot over 240 min. At 240 minute, the remaining Initiator Solution was fed into the pot over 1 min, and the reaction was refluxed and addition 60 min. 500 grams of polymer solution were mixed with 293 grams of N-methyl pyrrolidone and heated to remove isopropylalcohol. The final product was a solution of a methylmethacrylate (62)-co-styrene(15)-g-methoxypolyehtyleneglycol methacrylate (23) graft copolymer at 37% solids.

Example 3

A 2-liter flask was equipped with a mechanical stirrer, thermocouple, N2 inlet, and addition funnels. N-methyl pyrrolidone, 180 gm and isopropanol, 75 gm were added to the pot and heated to reflux. Feed I [a 50% solution of methoxypolyethyleneglycol methacrylate (Bisomer S20W, International Specialty Chemicals) in water, 180 gm, benzyl methacrylate, 210 gm, N-methyl pyrrolidone, 60 gm and isopropanol, 45 gm], and Feed II [Lupersol® 11, 6 gm, dissolved in N-methyl pyrrolidone, 24 gm] were started at time 0.0 minutes. Feed I was added over 360 min; Feed II was added over 390 min. After all feeds were complete, the reaction was refluxed and additional 30 minutes. The final product was a solution of benzyl methacrylate (70)-g-methoxypolyethyleneglycol methacrylate (30) graft copolymer at 38.2% solids.

Example 4

A 5-liter flask was equipped with a mechanical stirred thermocouple, N2 inlet, and addition funnels. Propylene glycol propyl ether, 1100 gm, and a 50% solution of methoxypolyethyleneglycol methacrylate (Bisomer S20W, International Specialty Chemicals) in water, 75 gm, were added to the pot and heated to reflux. Feed I [Bisomer S20W, 425 gm], Feed II [methyl methacrylate, 750 gm] and Feed III [VASZO(67, 20 gm dissolved in propylene glycol propyl ether, 180 gm] were started at time 0.0 minutes. Feeds I and III were added over 360 min; Feed III was added over 390 min. After all feeds were complete, the reaction was refluxed and additional 30 minutes. The final product was benzyl methacrylate (75)-g-methoxypolyethyleneglycol methacrylate (25) at 38.9% solids.

Example 5

Glossary of Terms:

PnP Downaol® PnP (Dow Chemical): propylene glycol n-propyl ether
S-7602 Silwet® L7602 (OSI Specialties): polyalkyene oxide modified dimethyl polysiloxane surfactant
BYK-019 (BYK Chemie): silicone defoamer
BYK-024 (BYK Chemie): silicone defoamer A cyan ink concentrate was prepared by mixing the first three ingredients together and then processing the mixture on a two roll mill for 30 minutes. The chip was then dissolved in the remaining ingredients listed.

| | |
|---|---|
| benzyl methacrylate (13)-b-methacrylic acid (10) at 49.7% solids | 402.4 g |
| phthalocyanine pigment | 300 g |
| diethylene glycol | 45 g |
| N-methyl pyrrolidone | 426.4 g |
| Proxel GXL | 7.99 g |
| Deionized water | 1861.34 g |

Ink Samples 1 and 2 were then prepared using the concentrate as follows. Amounts are expressed in grams unless otherwise noted.

| | Ink Sample No. | |
|---|---|---|
| Component | 1 | 2 |
| Cyan Concentrate | 20 | 12 |
| PnP | | 6 |
| BYK-019 | 0.9 | |
| BYK-024 | 0.6 | |
| S-7602 | 2 | |
| graft co-polymer from example 1 | | 12.1 |
| graft co-polymer from example 2 | 6.8 | |
| graft co-polymer from example 3 | 13.1 | |
| N-methyl pyrrolidone | 8.3 | |
| hexylene glycol | 10 | 3 |
| diethylene glycol | 7 | 6 |
| Water | 38.3 | 20.9 |

Ink Samples 1 and 2 where then printed using a Trident PixelJet 64 pen onto different textile substrates as identified in the table below and sent for wash testing according to AATCC-61, 1A. Results are reported below.

| Ink Sample | Textile | Optical Density (as printed) | Optical Density (after wash) |
|---|---|---|---|
| 1 | Cotton knit | 0.3 | 0.25 |
| 2 | Cotton knit | 0.55 | 0.52 |
| 2 | poly 730 | 0.51 | 0.47 |
| 2 | 400M | 0.71 | 0.61 |
| 2 | poly batiste | 0.51 | 0.41 |
| 2 | poly/cotton 50/50 | 0.61 | 0.56 |

What is claimed is:

1. An aqueous coating composition comprising:
   (a) an aqueous vehicle comprising water and at least one organic co-solvent, wherein water comprises no more than 80% by weight of the total weight of the vehicle, and wherein the co-solvent is water-soluble or water-miscible so as to form a single phase vehicle with water;
   (b) a pigment dispersion comprising a pigment and a polymeric dispersant, and
   (c) a film-forming, non-ionic graft copolymer binder comprising a hydrophobic backbone and non-ionic, hydrophilic side chains, sad side chains having a number average molecular weight of at least 500, wherein the graft copolymer is soluble in the vehicle but substantially insoluble in water.

2. The composition of claim 1, wherein said aqueous vehicle comprises 60–70% by weight of water based on the total weight of the vehicle.

3. The composition of claim 1, comprising:
   (a) an aqueous vehicle comprising water, a water miscible pyrrolidone, and a glycol ether, wherein water comprises no more than 80% by weight, based on the total weight of the vehicle;
   (b) a graft copolymer binder having a hydrophobic backbone and non-ionic, hydrophilic side chains, which binder is soluble in the aqueous vehicle but substantially insoluble in water; and
   (c) a surfactant selected from the group consisting of silicon surfactants and fluorinated surfactants.

4. The composition of claim 1, wherein the graft copolymer backbone is comprised of monomers selected from the group consisting of methyl acrylate, methyl methacrylate, styrene, alpha-methyl styrene, phenyl acrylate, phenyl methacrylate, benzyl acrylate, benzyl methacrylate, 2-phenylethyl acrylate, 2-phenylethyl methacrylate, 2-phenoxyethyl acrylate, 2-phenoxyethyl methacrylate, 1-naphthalyl acrylate, 2-naphthalyl acrylate, 2-naphthalyl methacrylate, p-nitrophenyl acrylate, p-nitrophenyl methacrylate, phthalimidomethyl acrylate, phthalimidomethyl methacrylate, N-phenyl acrylamide, N-phenyl methacrylamide, N-benzyl acrylamide, N-(2-phenylethyl)acrylamide, N-(2-phthalimidoethoxymethyl) acrylamide, vinyl benzoate, ethyl acrylate, n-butyl acrylate, 2-ethylhexyl acrylate, ethyl methacrylate, n-butyl methacrylate, t-butyl methacrylate, 2-ethylhexyl methacrylate, cyclohexyl methacrylate, vinyl acetate, and vinyl butyrate.

5. The composition of claim 1, wherein the side chains have a number average molecular weight of 1000–2000 and comprise macromonomers which are
   (a) soluble in water but are insoluble in non-polar organic solvents; and
   (b) made from non-ionic monomers selected from the group consisting of ethyoxytriethylene glycol methacrylate, methoxypolyethylene oxide methacrylate methoxypolyethylene oxide acrylate, polyethylenoxide methacrylate, polyethylenoxide acrylate, and N-vinyl pyrrolidone.

6. The composition of claim 1, wherein the side chains comprises 15–60% by weight of the graft copolymer.

7. A washfast ink composition for use in printing of textiles comprising:
   (a) an aqueous vehicle comprising water and at least one organic co-solvent, wherein water comprises no more than 80% by weight of the total weight of the vehicle, and wherein the co-solvent is water-soluble or water-miscible so as to form a single phase vehicle with water;
   (b) a pigment dispersion comprising a pigment and a polymeric dispersant, and
   (c) a film-forming, non-ionic graft copolymer binder comprising a hydrophobic backbone and non-ionic, hydrophilic side chains, said side chains having a number average molecular weight of at least 500, wherein the graft copolymer is soluble in the vehicle but substantially insoluble in water.

8. The ink composition of claim 7, wherein said aqueous vehicle comprises 60–70% by weight of water based on the total weight of the vehicle.

9. The ink composition of claim 7, wherein the graft copolymer backbone is comprised of monomers selected from the group consisting of methyl acrylate, methyl methacrylate, styrene, alpha-methyl styrene, phenyl acrylate, phenyl methacrylate, benzyl acrylate, benzyl methacrylate, 2-phenylethyl acrylate, 2-phenylethyl methacrylate, 2-phenoxyethyl acrylate, 2-phenoxyethyl methacrylate, 1-naphthalyl acrylate, 2-naphthalyl acrylate, 2-naphthalyl methacrylate, p-nitrophenyl acrylate, p-nitrophenyl methacrylate, phthalimidomethyl acrylate, phthalimidomethyl methacrylate, N-phenyl acrylamide, N-phenyl methacrylamide, N-benzyl acrylamide, N-(2-phenylethyl)acrylamide, N-(2-phthalimidoethoxymethyl) acrylamide, vinyl benzoate, ethyl acrylate, n-butyl acrylate, 2-ethylhexyl acrylate, ethyl methacrylate, n-butyl methacrylate, t-butyl methacrylate, 2-ethylhexyl methacrylate, cyclohexyl methacrylate, vinyl acetate, and vinyl butyrate.

10. The ink composition of claim 7, wherein the side chains have a number average molecular weight of 1000–2000 and comprise macromonomers which are
   (a) soluble in water but are insoluble in non-polar organic solvents; and
   (b) made from non-ionic monomers selected from the group consisting of ethyoxytriethylene glycol methacrylate, methoxypolyethylene oxide methacrylate, methoxypolyethylene oxide acryate, polyethylenoxide methacrylate, polyethylenoxide acrylate, and N-vinyl pyrrolidine.

11. The ink composition of claim 7, wherein the side chains comprise 15–60% by weight of the graft copolymer.

* * * * *